United States Patent [19]
Anglade

[11] 4,371,056
[45] Feb. 1, 1983

[54] GUARDRAILING FOR VEHICLES

[76] Inventor: Rene Anglade, 48, Rue Anatole, 60110 Meru, Oise, France

[21] Appl. No.: 233,204

[22] Filed: Feb. 10, 1981

[51] Int. Cl.³ ............................ E06C 5/06; E06C 1/38
[52] U.S. Cl. ...................................... 182/127; 182/96; 182/106; 182/113; 182/159
[58] Field of Search ............... 182/78, 77, 113, 82–86, 182/96, 95, 159, 160, 127, 106; 105/447, 430, 431

[56] References Cited
U.S. PATENT DOCUMENTS
3,807,120 4/1974 Viandon .

FOREIGN PATENT DOCUMENTS
851135 5/1977 Belgium .
2063453 9/1971 France .
2142787 2/1973 France .
926289 5/1963 United Kingdom .

Primary Examiner—Reinaldo P. Machado
Attorney, Agent, or Firm—Young & Thompson

[57] ABSTRACT

A vehicle such as a tank truck having a catwalk along its top, is provided with a guardrail therealong that can be lowered during transport. A ladder provides access to the catwalk; and the guardrail and the ladder are so interconnected that when the guardrail is lowered, the rungs of the ladder are raised to prevent access to the catwalk.

5 Claims, 3 Drawing Figures

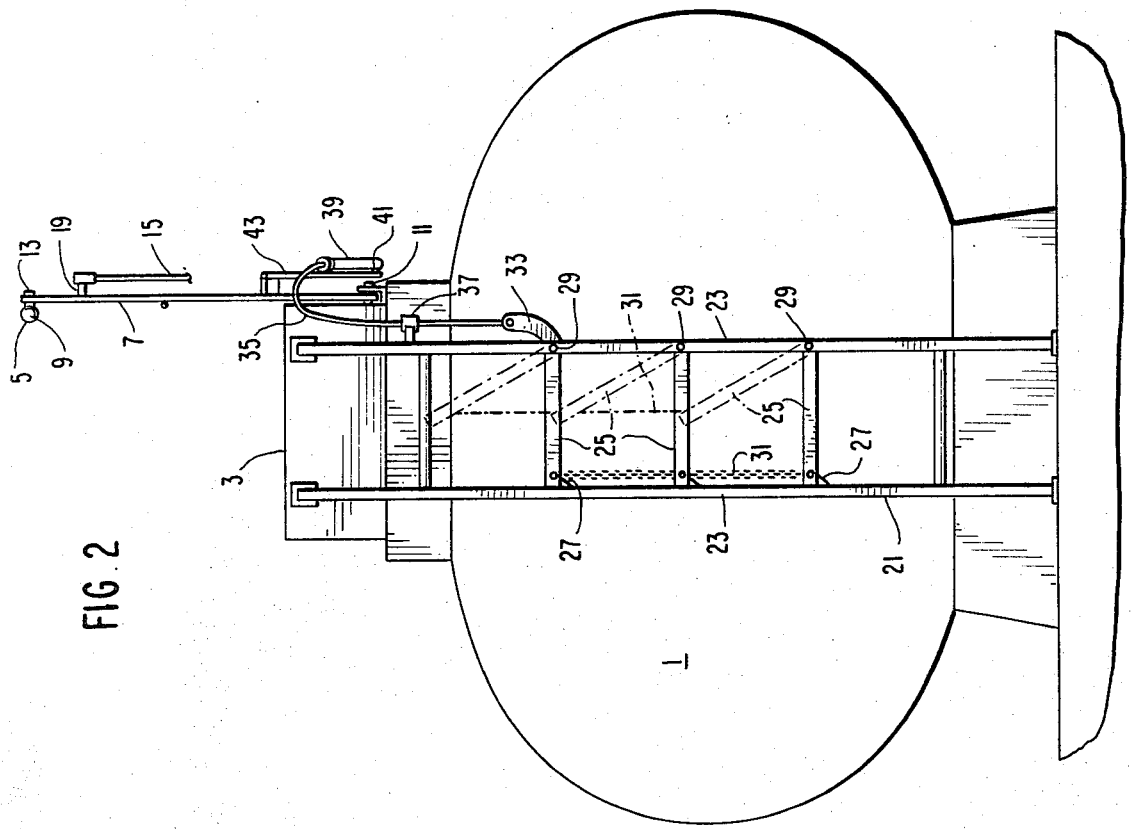
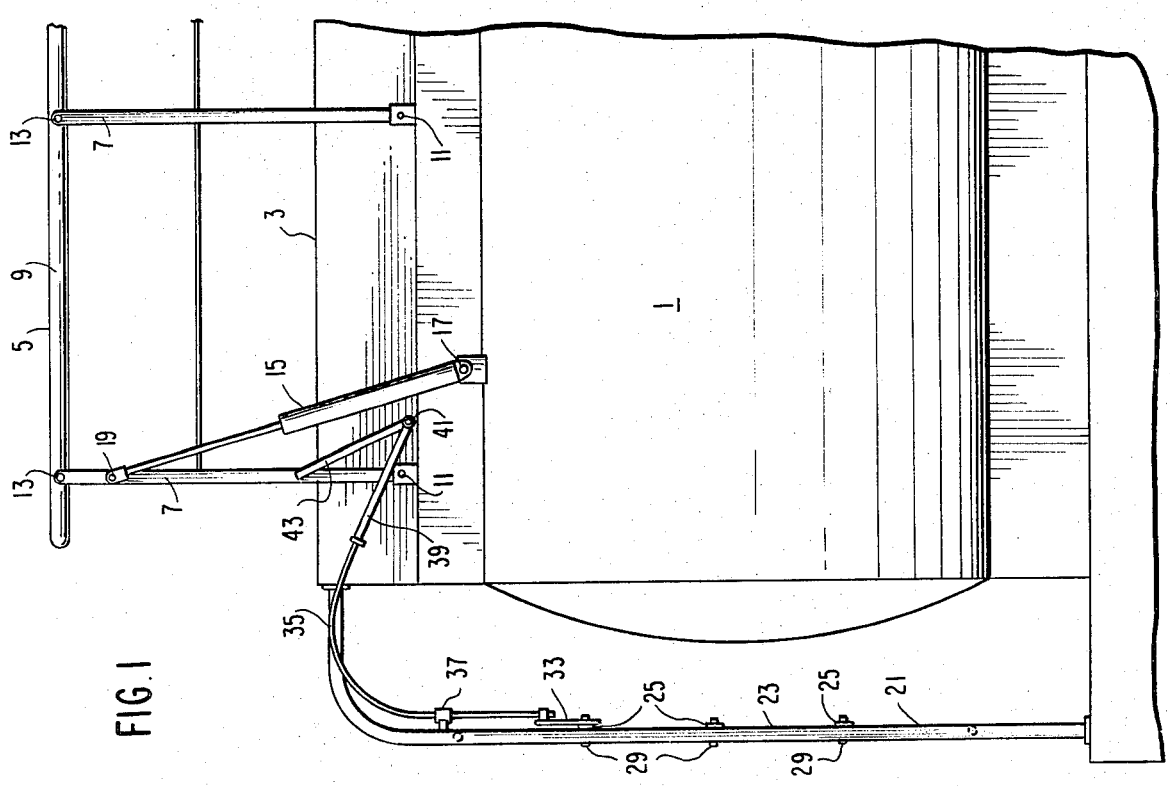

GUARDRAILING FOR VEHICLES

The present invention relates to guardrailings for vehicles, more particularly to such guardrails disposed along the top of a vehicle that has a catwalk running lengthwise thereof, such as a tank truck.

Access to such a catwalk is conventionally provided by a ladder. Also, it is desirable to be able to lower the guardrailing when the vehicle is to be moved, so as to reduce the overall height of the vehicle.

The present invention has as its principal object the provision of such a guardrail for a vehicle, that can be raised and lowered, which in its lowered condition also ensures that access to the catwalk via the ladder will be interrupted.

Briefly, this object is achieved in that the ladder is provided with rungs that are movable relative to the uprights of the ladder, between lowered operative positions in which they afford access to the catwalk, and raised inoperative positions in which the ladder cannot be used. The rungs are so interconnected with the railing, that when the railing is lowered the rungs are raised, and vice versa.

Other objects, features and advantages of the present invention will become apparent from a consideration of the following description, taken in connection with the accompanying drawings, in which:

FIG. 1 is a fragmentary side elevational view of a tank truck having a guardrailing and access ladder according to the present invention;

FIG. 2 is an end elevational view thereof from the left of FIG. 1; and

Figure 3:
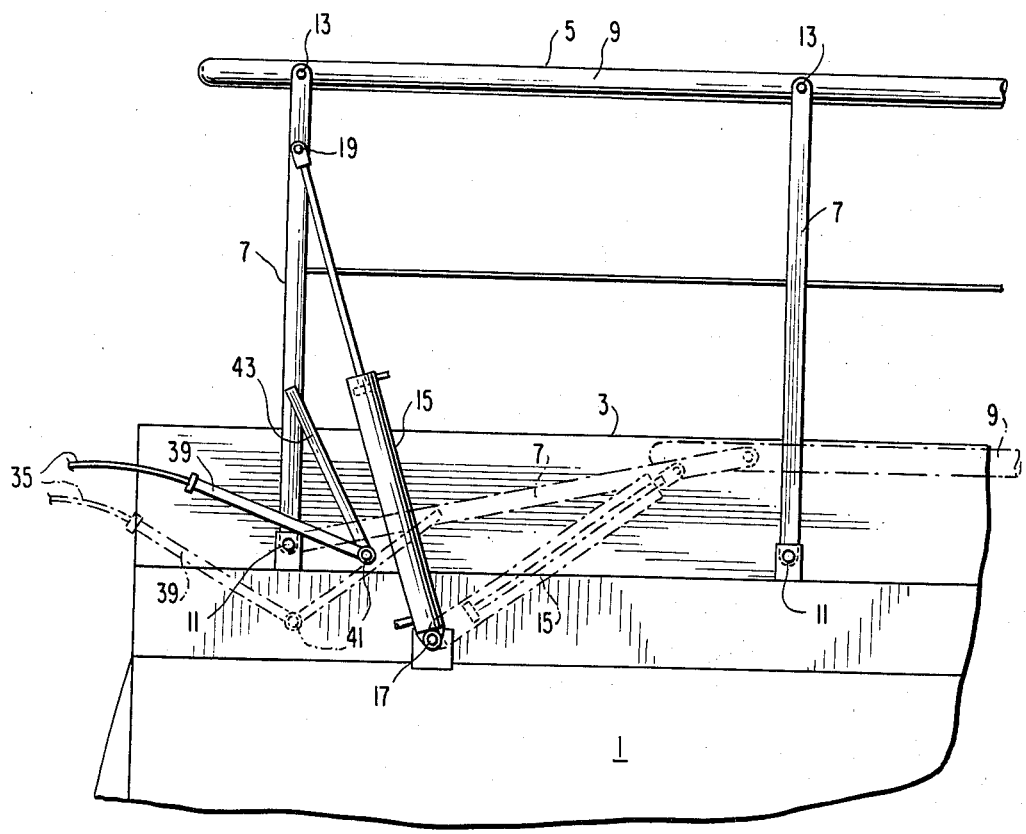
FIG. 3 is an enlarged fragmentary side elevational view of the guardrailing.

Referring now to the drawings in greater detail, there is shown a motor vehicle in the form of a tank truck indicated generally at 1, having a horizontal catwalk 3 extending lengthwise along its top to provide a walkway for the driver or other workers who must have access to the tank of the truck from above.

A guardrailing 5 extends lengthwise of the vehicle along and to one side of catwalk 3, to provide security for those persons using the catwalk. Railing 5 is comprised of a plurality of uprights 7 which bear at their top a horizontal handrail 9. Uprights 7 are pivotally connected for horizontal swinging movement on and relative to truck 1 about horizontal pivots 11 and on and relative to handrail 5 about horizontal pivots 13.

A fluid pressure jack 15, operated for example by conventional hydraulic circuitry (not shown) from a pump (not shown) mounted on truck 1, raises and lowers handrail 5. To this end, jack 15 is pivotally connected to truck 1 about a horizontal pivot 17 and pivotally connected to one of the uprights 7 about a horizontal pivot 19. It will be appreciated that the jack 15 is a double-acting jack, which, when retracted, lowers handrail 9 and, when extended, raises handrail 9. Guardrailing 5 thus acts as parallellogram linkage, with handrail 9 remaining horizontal both in its lowered and in its raised positions.

An upright ladder 21 is mounted on the rear of tank truck 1, and comprises conventional uprights 23 with rungs 25 extending between them. In their lowered or full line positions as shown in FIG. 2, rungs 25 rest at their left ends on supports 27 and are secured at their right ends by pivots 29 to one of the uprights 23. A chain 31 interconnects the left ends of the rungs 25, so that the raising of the top rung 25 will raise the lower rungs 25.

To raise and lower the rungs 25, a lever 33 is connected to the uppermost rung 25; and to swing lever 33, a semi-rigid cable 35 is secured at one of its ends to the free end of lever 33 and passes through guide 37 secured to one of the uprights 23 of ladder 21 and is secured at its other end to a rod 39. Rod 39 is connected by a horizontal pivot 41 to a rod 43 which is fixedly secured at its upper end to one of the uprights 7 of guardrailing 5.

Cable 35 is semi-rigid in the sense that it has sufficient flexibility to run through guide 37, while at the same time being sufficiently rigid to ensure that it will push down lever 33 as well as pull up lever 33. This movement of cable 35 takes place upon vertical swinging movement of upright 7 to which rod 43 is secured. As can be seen by comparison of the full and phantom line positions of the mechanism shown in FIG. 3, the movement of upright 7 from the raised full line position to the lowered phantom line position, results in a corresponding swinging of pivot 41 about the corresponding pivot 11 as an axis, which in turn pushes cable 33 through guide 37 to the extent necessary to swing lever 33 downward, which raises rungs 25 to the phantom line position of FIG. 2. Moreover, the rigidity of cable 35 is sufficient that the rungs 25 cannot be swung down manually to a position in which they can be used to give access to catwalk 3.

Correspondingly, when jack 15 is operated to raise the guardrailing 5, and uprights 7 swing to their vertical position, cable 35 is pulled back through the guide 37 to swing lever 33 upwardly and to lower rungs 25 against their respective supports 27, thereby simultaneously to raise the guardrailing 5 to operative position and to provide access thereto via ladder 21.

It will also be understood that the hydraulic fluid in the hydraulic circuit of jack 15 serves as a brake such that the handrail can be moved, and hence the ladder rungs raised and lowered, only upon operation of the pump in the hydraulic circuit. Thus, the device cannot be manually operated in reverse, by attempting to force the ladder rungs up or down.

From a consideration of the foregoing disclosure, therefore, it will be evident that the initially recited object of the present invention has been achieved.

Although the invention has been described and illustrated in connection with a preferred embodiment, it is to be understood that modifications and variations may be resorted to without departing from the spirit of the invention, as those skilled in this art will readily understand. Such modifications and variations are considered to be within the purview and scope of the present invention as defined by the apppended claims.

What is claimed is:

1. In a motor vehicle having a guardrailing extending lengthwise of the top of the vehicle, means to raise and lower the guardrailing, and a ladder to provide access to the top of the vehicle; the improvement in which the ladder has rungs that are mounted for movement between an operative position in which the ladder gives access to the top of the vehicle and in inoperative position in which the ladder provides no access to the top of the vehicle, and means interconnecting the guardrailing and the ladder rungs whereby when the guardrailing is lowered the rungs are moved to said inoperative position and when the guardrailing is raised the rungs are moved to said operative position.

2. Structure as claimed in claim 1, said ladder having two spaced uprights between which said rungs extend, means mounting said rungs for vertical swinging movement on and relative to one of said uprights, and means for swinging said rungs conjointly between raised and lowered positions, said raised position comprising said inoperative position and said lowered position comprising said operative position.

3. Apparatus as claimed in claim 2, the last-named means comprising a lever secured to one of said rungs, means interconnecting the vertically swinging ends of said rungs, and means interconnecting said lever with said guardrailing to lower said lever and to raise said rungs when said guardrailing is lowered and to raise said lever and lower said rungs when said guardrailing is raised.

4. Apparatus as claimed in claim 3, said lever being secured to the uppermost of said rungs.

5. Structure as claimed in claim 1, said raising and lowering means for said guardrailing comprising a hydraulic jack.

* * * * *